United States Patent
Tomoiu

(10) Patent No.: US 6,546,726 B1
(45) Date of Patent: Apr. 15, 2003

(54) GRAVITY POWER PLANT

(76) Inventor: Constantin Tomoiu, 11 Old South Ave., Stratford, CT (US) 06497

( * ) Notice: Subject to any disclaimer, the term of this patent is extended or adjusted under 35 U.S.C. 154(b) by 0 days.

(21) Appl. No.: 10/108,787

(22) Filed: Mar. 28, 2002

Related U.S. Application Data

(60) Provisional application No. 60/280,910, filed on Apr. 2, 2001.

(51) Int. Cl.[7] .................................. F03C 1/00
(52) U.S. Cl. .......................... 60/495; 60/496
(58) Field of Search .................. 60/495, 496

(56) References Cited

U.S. PATENT DOCUMENTS

| | | | | |
|---|---|---|---|---|
| 4,084,375 A | * | 4/1978 | Horvath | 60/496 |
| 4,317,046 A | * | 2/1982 | Holmberg | 290/1 R |
| 5,552,657 A | * | 9/1996 | Epstein et al. | 310/339 |
| 5,578,889 A | * | 11/1996 | Epstein | 310/339 |

* cited by examiner

Primary Examiner—Hoang Nguyen
(74) Attorney, Agent, or Firm—Fattibene & Fattibene; Paul A. Fattibene; Arthur T. Fattibene

(57) ABSTRACT

A power plant for producing electricity utilizing the buoyancy of a liquid. A first and second expandable chamber are each place in a liquid filled shaft are coupled together with a cable so that when one of the expandable chambers is raised, the other one is lowered. The cable is couple to a pulley for turning a generator for producing electricity. An electrode and electrolyte are placed within each expandable chamber for generating heat and steam to expand the expandable chamber when the expandable chamber is at the bottom of the liquid filed shaft. The increased volume of the expandable chamber causes it to rise in the liquid filled shaft at the same time as the other expandable chamber is reduced in volume and caused to be lowered into the other liquid filed shaft. A valve in the expandable chamber releases the steam causing the volume of the expandable chamber to be reduced. The released steam may be used to power a turbine or enter a heat exchanger.

17 Claims, 3 Drawing Sheets

GRAVITY POWER PLANT

RELATED APPLICATION

This application claims the benefit of U.S. Provisional Patent Application No. 60/280,910 filed on Apr. 2, 2001.

FIELD OF THE INVENTION

The present invention relates generally to the generation of electrical power, and more particularly to a gravity assisted power plant utilizing the displacement of a fluid.

BACKGROUND OF THE INVENTION

There are many types of power plants used as a means for converting stored energy into work. Typically, power plants must be located near sources of stored energy such as coal fields or river dams or are located near the places where work is to be performed. Power plants generally convert the stored energy of fossil fuels, such as oil, into kinetic energy. This kinetic energy is often a spinning shaft. The fossil fuels are generally burned to produce steam used to drive a turbine. The turbine is often connected to a generator for the generation of electrical energy, which is easily distributed. Nuclear energy is also used to generate steam to drive turbines and produce electricity. Hydroelectric power plants are also common and use elevated water supplies or the energy of moving water in a river for producing electricity.

In the effort to produce more electricity and power from the diminishing supply of fossil fuels, alternative sources of energy have been investigated, such as wind, tides, waves, geothermal sources, ocean thermal, nuclear fusion, and solar radiation. However, most of these alternative sources of power have been of negligible commercial significance.

Therefore, there is a need for a power plant that is relatively simple and easily constructed that can use renewable resources to generate electrical power.

SUMMARY OF THE INVENTION

The present invention uses gravity and Archimedes's principle to generate power efficiently. A first and second expandable chamber are connected by a cable and attached to a pulley. The first and second expandable chambers are adapted to move up and down in a first and second shaft, respectively. Each shaft is filled with a buoyant fluid, such as salt water. Inside the first and second expandable chambers is an electrolyte and electrode. Electrical energy supplied to the electrode causes the electrolyte to generate steam, expanding the expandable chamber. The expandable chamber is then caused to rise within the fluid filled shaft with the other expandable chamber being lowered into the other fluid filed shaft. Prior to being lowered, the expandable chamber releases or expels the previously generated steam or gas, causing the expandable chamber to decrease in volume.

By repeating the process of alternately raising and lowering the expandable chambers, the pulley connected to the cable rotates, producing work capable of generating electricity.

Accordingly, it is an object of the present invention to provide a power plant that uses gravity to assist in producing electricity.

It is an advantage of the present invention that it is relatively efficient.

It is another advantage of the present invention that it has a quite operation and produces no combustion gases.

It is a feature of the present invention that an expandable chamber placed in a shaft filled with fluid is used.

It is another feature of the present invention that an electrolyte and electrode are used within the expandable chamber to expand the expandable chamber.

These and other objects, advantages, and features will become more readily apparent in view of the following detailed description.

DETAILED DESCRIPTION OF THE PREFERRED EMBODIMENT

Figure 1:
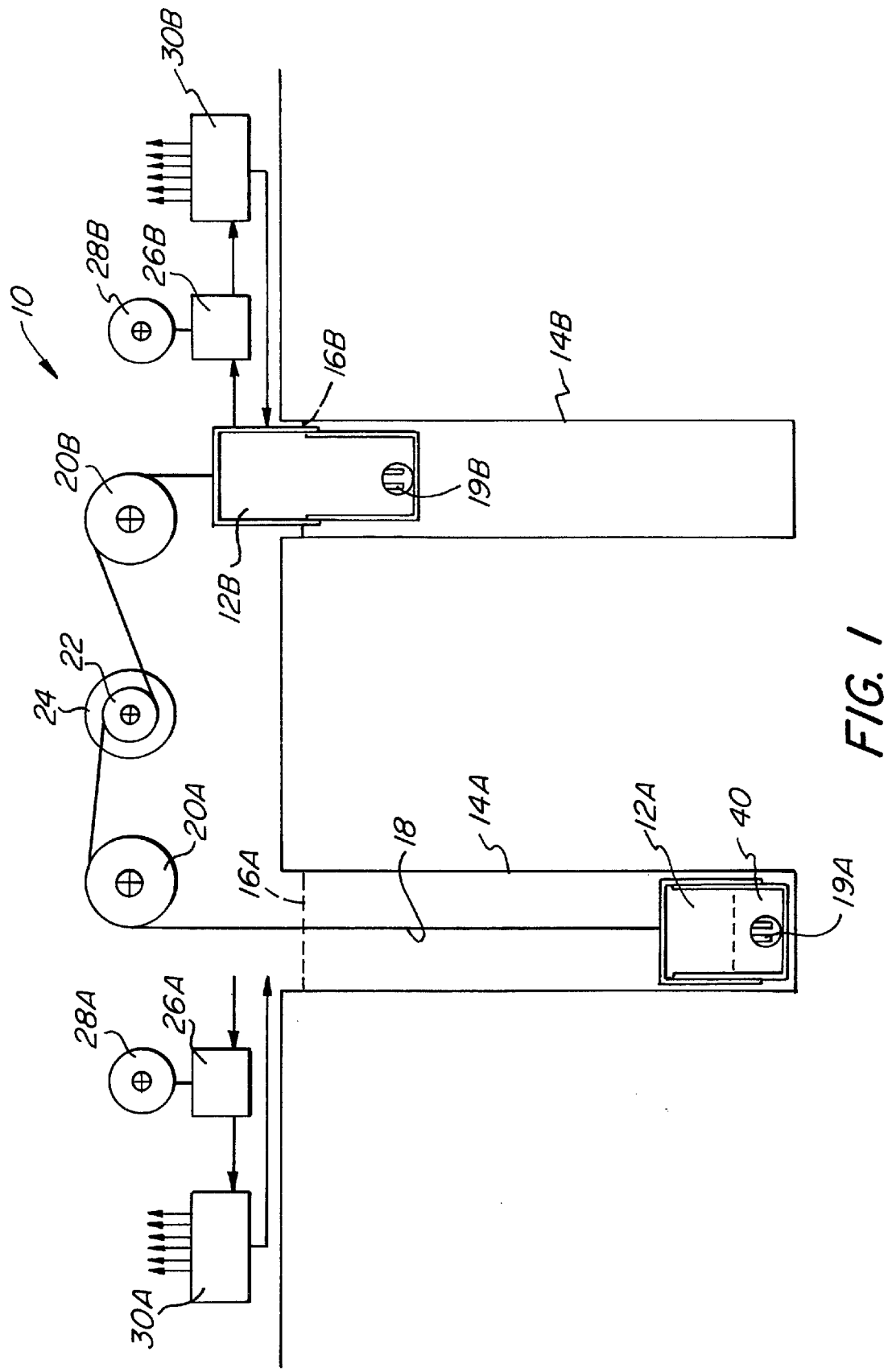
FIG. 1 schematically illustrates a power plant according to the present invention.

FIG. 1 schematically illustrates a power plant utilizing gravity and Archimedes' principle to efficiently generate electricity. The gravity power plant 10 has a plurality of wells or shafts 14A and 14B. An expansion chamber 12A and 12B is placed in each of the respective shafts or wells 14A and 14B. A cable 18 connects the two expansion chambers 12A and 12B. Within each of the two expansion chambers 12A and 12B is a fluid, preferably white vinegar. Within each shaft is a fluid, such as saltwater. The fluid or water is filled to a fluid level 16A and 16B. Within each of the expansion chambers 12A and 12B is a heat generator or electrodes 19A and 19B, respectively. The cable 18 goes around pulleys 20A and 20B and around a central pulley 22. The central pulley 22 is connected to an electric generator 24. Associated with each respective expansion chamber 12A and 12B is a steam turbine 26A and 26B. The steam turbine 26A and 26B are each associated with an electric generator 28A and 28B. The steam turbine 26A and 26B are also associated, respectively, with a heat exchanger 30A and 30B.

Figure 2:
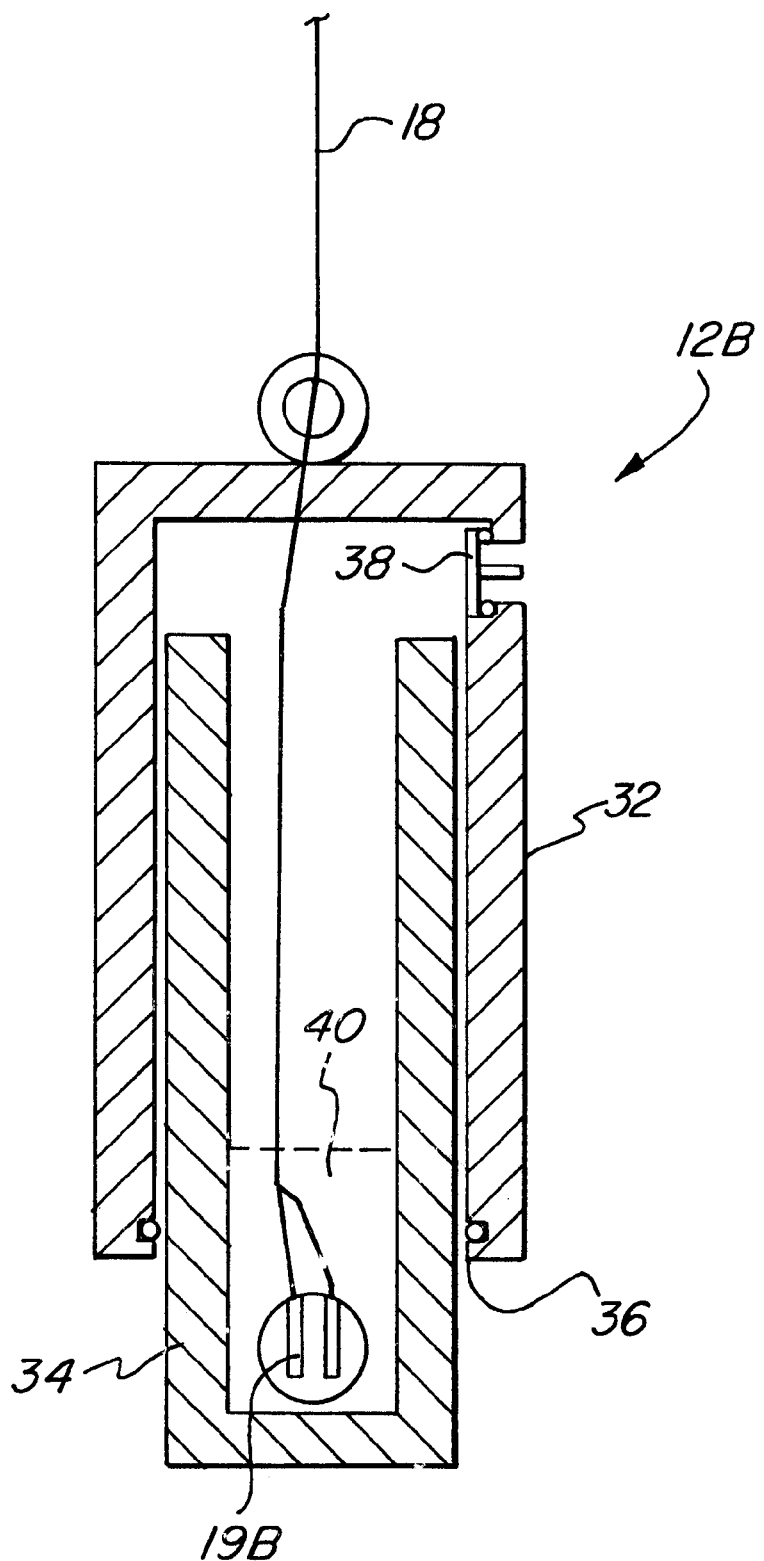
FIG. 2 schematically illustrates in more detail the expansion chambers illustrated in FIG. 1.

FIG. 2 illustrates in more detail a cross-section of the expansion chamber 12B, illustrate in FIG. 1. Expansion chamber 12B comprises a top cylinder 32 and a bottom cylinder 34. The top cylinder 32 is telescopically connected to the bottom cylinder 34. A seal 36 seals the top cylinder 32 and the bottom cylinder 34 of the expansion chamber. Accordingly, the volume within the expansion chamber 12B can increase and decrease by the sliding of the top cylinder 32 and the bottom cylinder 34. Within the expansion chamber 12B is a fluid 40. The fluid 40 is preferably white vinegar. A heating device or electrodes 19B is placed within the liquid 40. Cable 18 is coupled to the electrode 19B and carries electricity so as to generate heat. A valve 38 is placed new the upper edge of the top cylinder 32. The top cylinder 32 and the bottom cylinder 34 of the expansion chamber 12B may be made of a thermally insulated material to prevent heat energy from being lost and to improve efficiency. Expansion chamber 12A, illustrated in FIG. 1, is similar or identical in construction to expansion chamber 12B.

Operation of the present invention can readily be appreciated with reference to FIGS. 1 and 2. The expansion chamber 12A is initially placed at the bottom of the well 14A. Electric current is supplied through cable 18. A storage device attached to the electric generator 24 could provide this current. Upon applying an electric current to the electrode 19A, the fluid 40 within the expansion chamber 12A is caused to heat up or boil, generating a gas and a pressure within the expansion chamber 12A. Accordingly, the expansion chamber 12A is caused to increase in volume resulting in buoyancy due to Archimedes' principle.

According to Archimedes' principle, a body immersed in static fluid is acted upon by a vertical force equal to the weight of fluid displaced, and a body floating in the fluid displaces its own weight of fluids. As a result, the expansion chamber ascends because it displaces a volume of liquid which weighs more than the weight of the expansion chamber. Accordingly, this force, which is called the buoyant force, acts vertically upward through the centroid of the displaced volume of fluid.

As the expansion chamber 12A rises, the other attached expansion chamber 12B is lowered into the well 14B. As a result, pulleys 20A, 22, and 20B are caused to rotate. The rotation of central pulley 22 causes electric generator 24 to rotate generating electricity. After the expansion chamber 12A floats to the surface, a valve releases the steam into steam turbine 26A, causing the electric generator 28A to rotate generating additional electricity. The residual steam may be directed to a heat exchanger 30A, which can be used to provide a lower level of heat such as for heating a building, and also condenses the steam to a liquid. The liquid is then returned to the expansion chamber 12A. The expansion chamber 12A is then caused to sink starting the cycle again.

Figure 3:
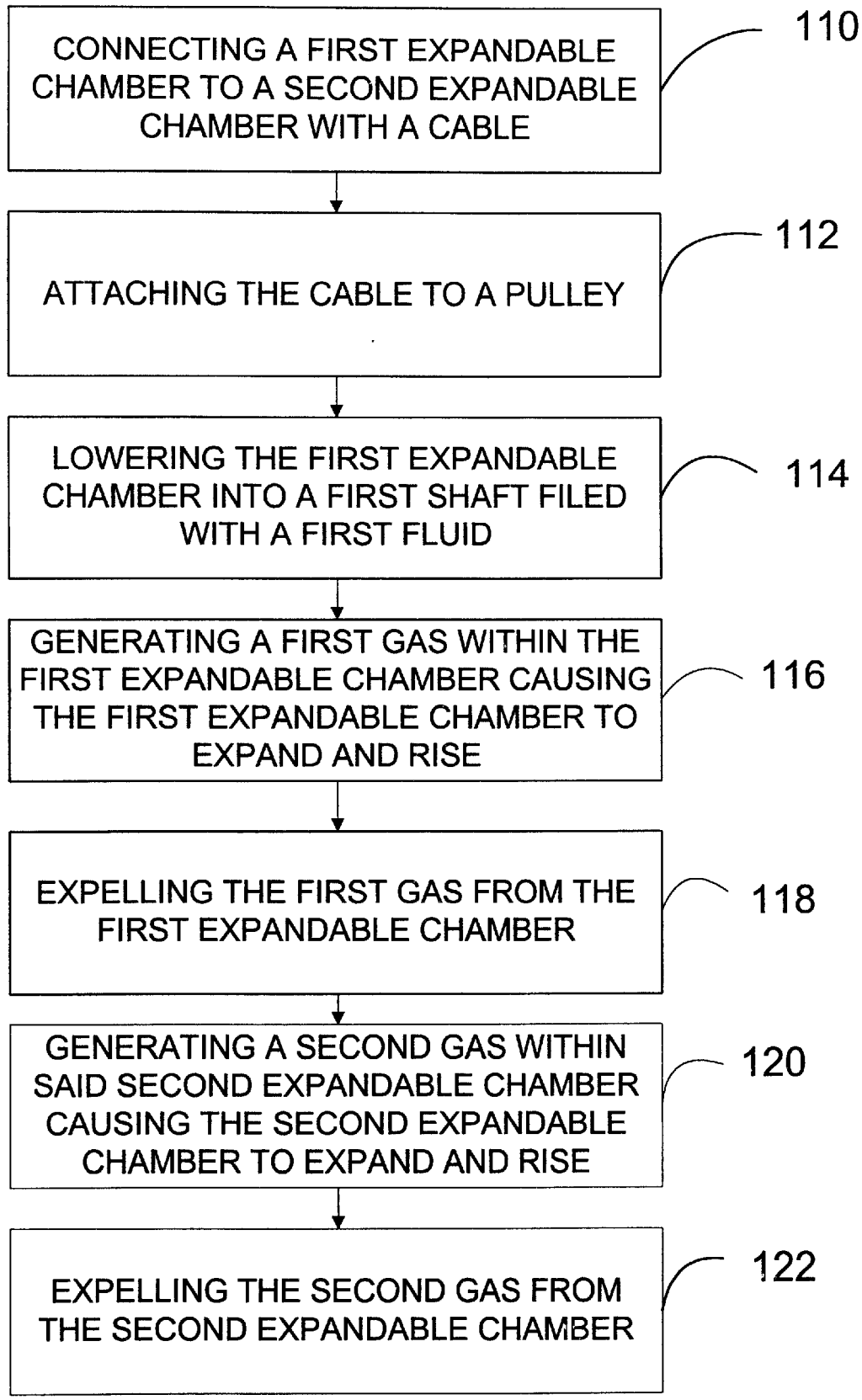
FIG. 3 is a block diagram illustrating the method steps of the present invention.

FIG. 3 is a block diagram illustrating the process or method steps utilized in the present invention. Block 110 represents the step or act of connecting a first expandable chamber to a second expandable chamber with a cable. Block 112 represents the step or act of attaching the cable to a pulley or other equivalent device for moving generator. This pulley may be attached to a shaft, which turns a generator for producing electricity. Block 114 represents the act or step of lowering the first expandable chamber into a first shaft filled with a first fluid. The fluid may be saltwater or any buoyant liquid. Block 116 represents the act or step of generating a first gas within the first expandable chamber, causing the first expandable chamber to expand and rise in the first liquid and the second expandable chamber to be lowered into a second shaft filled with a second fluid. The second fluid is preferably the same as the first fluid. The first gas may be generated by any means, but is preferably generated with the use of an electrode placed within an electrolyte. The electrolyte is preferably white vinegar. Block 118 represents the step or act of expelling the first gas from the first expandable chamber. Upon expelling the first gas from the first expandable chamber, the expandable camber collapses and the volume of the expandable chamber is reduced. The expelled gas may be recovered and used to drive a steam turbine to produce additional electricity or to be provided to a heat exchanger in which the heat from the expelled gas may be extracted to heat a building or for other equivalent uses. Block 120 represents the act or step of generating a second gas within the second expandable chamber, causing the second expandable chamber to expand and rise in the second fluid and the first expandable chamber to be lowered into the first shaft. Block 122 represents the act or step of expelling the second gas from the second expandable chamber causing the second expandable chamber to collapse and the volume reduce. This cycle may be repeated continuously.

It should be appreciated that by practicing the method steps or acts of the present invention, the first and second expandable chambers are alternately raised and lowered within the first and second fluid column in the shafts. The change in volume created by the steam or gas, preferably generated by the electrode placed within the expandable chambers, when at the bottom of the fluid column causes the expandable chamber to increase in volume and rise within the fluid column. When at the top of the fluid column, the gas is expelled from the expandable chamber, causing the expandable chamber to collapse and reduce in volume, permitting it to be lowered again within the fluid column. This process is repeated, producing work. The expended gas or electrolyte may be replaced in liquid form when the expandable chamber is at the top of the fluid column. As a result, the process may be continuously repeated so as to produce work and generate electricity.

Accordingly, the present invention, in utilizing Archimedes' principle, provides an efficient power generator for producing electricity. The present invention can provide efficient and economical electricity for a variety of uses. Additionally, the residual heat can be used to heat a building or for other uses.

The present invention therefore is a practical and useful for efficiently generating electricity or providing energy for other purposes. The present invention can be made to as small a scale or as large a scale as desired, depending upon the power requirements.

While the present invention has been described with respect to several embodiments, it should be appreciated by those skilled in the art that various modifications may be made without departing from the spirit and scope of this invention.

What is claimed is:

1. A gravity power plant comprising:

a column of liquid;

an expandable chamber placed within said column of liquid;

an electrode placed within said expandable chamber;

an electrolyte placed within said expandable chamber contacting said electrode; and means, associated with said expandable chamber, for connecting said expandable chamber to a generator so that movement of said expandable chamber causes the generator to move generating electricity, whereby said electrode is capable of causing said electrolyte to be heated creating a gas and expanding said expandable chamber causing said expandable chamber to rise within said column of liquid.

2. A gravity power plant as in claim 1 wherein:

said means for connecting said expandable chamber to the generator comprises a cable and a pulley.

3. A gravity power plant as in claim 1 wherein:

said electrolyte is white vinegar.

4. A gravity power plant as in claim 1 further comprising:

means, associated with said expandable chamber, for recovering the gas generated within said expandable chamber.

5. A gravity power plant comprising:

a first shaft filled with a first liquid;

a first expandable chamber placed in said first shaft;

a first electrode placed within said first expandable chamber;

a second shaft filled with a second liquid;

a second expandable chamber placed in said second shaft;

a second electrode placed within said second expandable chamber;

an electrolyte placed in said first and second expandable chambers;

a cable connecting said first and second chambers; and a pulley attached to said cable, whereby said first and second expandable chambers are capable of alternately being raised and lowered within respective said first and second shafts causing said pulley to turn.

6. A gravity power plant as in claim 5 wherein:

said electrolyte is white vinegar.

7. A gravity power plant as in claim 5 further comprising:

means, associated with said expandable chamber, for recovering a gas generated within said expandable chamber.

8. A gravity power plant as in claim 5 further comprising:

a valve placed in each of said first and second expandable chambers, whereby a gas is capable of being released through said valve.

9. A gravity power plant as in claim 5 wherein each of said first and second expandable chambers comprises:

a top cylinder;

a bottom cylinder, said bottom cylinder adapted to slide within said top cylinder; and a seal placed between said top cylinder and said bottom cylinder.

10. A gravity power plant using Archimedes' principle comprising:

a first shaft filled with a first liquid;

a first expandable chamber placed in said first shaft;

a first electrode placed within said first expandable chamber;

a first valve associated with said first expandable chamber, whereby steam is capable of selectively being released from said first expandable chamber;

a first steam turbine located adjacent a position of said first valve, whereby the steam released from said first valve is directed to said first steam turbine;

a first generator coupled to said first steam turbine;

a first heat exchanger located adjacent said first steam turbine, whereby heat from the steam exiting said first steam turbine is capable of being exchanged;

a second shaft filled with a second liquid;

a second expandable chamber placed in said second shaft;

a second electrode placed within said second expandable chamber;

a second valve associated with said second expandable chamber, whereby steam is capable of selectively being released from said second expandable chamber;

a second steam turbine located adjacent a position of said second valve, whereby the steam released from said second valve is directed to said second steam turbine;

a second generator coupled to said second steam turbine;

a second heat exchanger located adjacent said second steam turbine, whereby heat from the steam exiting said second steam turbine is capable of being exchanged;

an electrolyte placed in said first and second expandable chambers;

a cable connecting said first and second chambers;

a pulley attached to said cable; and a third generator attached to said pulley, whereby said first and second expandable chambers are alternately raised and lowered within respective said first and second shafts causing said pulley to turn and generate electricity.

11. A gravity power plant as in claim 10 wherein each of said first and second expandable chambers comprises:

a top cylinder;

a bottom cylinder, said bottom cylinder adapted to slide within said top cylinder; and a seal placed between said top cylinder and said bottom cylinder.

12. A method of generating power comprising the steps of:

connecting a first expandable chamber to a second expandable chamber with a cable;

attaching the cable to a pulley lowering the first expandable chamber into a first shaft filed with a first liquid;

generating a first gas within the first expandable chamber causing the first expandable chamber to expand and rise in the first liquid and the second expandable chamber to be lowered into a second shaft filed with a second liquid;

expelling the first gas from the first expandable chamber; and generating a second gas within the second expandable chamber causing the second expandable chamber to expand and rise in the second liquid and the first expandable chamber to be lowered into the first shaft; and expelling the second gas from the second expandable chamber, whereby movement of said first and second expandable chambers causes the cable to rotate the pulley generating power.

13. A method of generating power as in claim 12 wherein the step of generating a first and second gas comprises the step of:

heating an electrolyte with an electrode.

14. A method of generating power as in claim 12 further comprising the step of:

connecting an electric generator to the pulley.

15. A method of generating power as in claim 12 further comprising the steps of:

collecting the first and second gas during the step of expelling; and directing the collecting first and second gases to a steam turbine.

16. A method of generating power as in claim 12 further comprising the steps of:

exchanging heat from the first and second gas to a heat exchanger.

17. A method of generating power as in claim 16 further comprising the steps of:

condensing the first and second gas forming condensation; and returning the condensation to said first and second expandable chamber.

* * * * *